Sept. 19, 1967   W. P. BERRYMAN   3,341,947
APPARATUS FOR MEASURING DIAMETERS
Filed March 31, 1965   2 Sheets-Sheet 1

INVENTOR
WALTER P. BERRYMAN.
BY
Holcombe, Wetherill + Brisebois
ATTORNEYS

Sept. 19, 1967 W. P. BERRYMAN 3,341,947
APPARATUS FOR MEASURING DIAMETERS
Filed March 31, 1965 2 Sheets-Sheet 2

INVENTOR
WALTER P. BERRYMAN.
BY
Holcombe, Wetherill + Brisebois
ATTORNEYS

United States Patent Office 3,341,947
Patented Sept. 19, 1967

3,341,947
APPARATUS FOR MEASURING DIAMETERS
Walter Pascoe Berryman, Bedford, England, assignor to George Richards & Company Limited, Altrincham, England, a company of Great Britain
Filed Mar. 31, 1965, Ser. No. 444,297
Claims priority, application Great Britain, Apr. 1, 1964, 13,459/64; July 3, 1964, 27,586/64
8 Claims. (Cl. 33—141.5)

This invention relates to a method of measuring the size of a bore, particularly a deep inaccessible bore such as is machined by a boring machine and also to apparatus for making such measurements.

According to the present invention a diameter of a bore is measured by running a wheel around the circumference of a cylindrical surface and counting the revolutions and part revolutions necessary to cover a multiple and/or a fraction of the circumference.

It has been discovered that a suitable wheel can be run round the inside of a bore without substantial slipping so that the total revolution of the wheel will be a true measure of the circumference and from this of course the diameter can be directly derived.

The invention has particular application to deep inaccessible bores and accordingly the method may be performed with the wheel carried on the end of a cantilever extending into the bore. The cantilever could of course be mounted on the head of a boring machine or other machine tool which has machined the bore and might indeed be on the tool holder itself.

The total revolution of the wheel so determined might be transmitted from the surface to a recording or indicating station by a radio link.

The invention includes apparatus for performing the method defined above comprising a wheel for running around the circumference and electrical means arranged to count the number of part revolutions of the wheel. In a preferred form of the invention the means comprises a disc or drum bearing fine angular divisions and an electrical pick-off arranged to count the number of divisions passing it.

The wheel may be mounted on the tool bar of a boring machine or the equivalent and may be associated with an engaging device for withdrawing the tool from contact with the bore wall and urging the wheel against the wall.

The apparatus might include some kind of brush for removing swarf from the wall as the wheel approaches it.

With this arrangement, it is expected that during a long boring operation machining can be stopped and the diameter of the bore cut so far can be measured, possibly without removing the bar from the bore merely by engaging the wheel instead of the tool and driving the machine to produce rotation of the wheel around the surface.

The moving part of the machine tool might carry a radio transmitter connected to the output of the electrical means so that the transmitter output is modulated in accordance with the electrical output. The radio transmitter may supply an aerial carried on the rotating part of the machine tool and co-operating with a receiving aerial on a stationary part so that no physical electrical contact is necessary between the fixed and moving parts of the machine tool. In particular it is preferred that the wheel, the disc or drum, the pick-off, the radio transmitter and the transmitting aerial—or such of them as are used in a particular case—may all be removably mounted on the machine tool.

At the recording or indicating station there can be a receiver of the radio signals and a counter arranged to count received radio signals corresponding to angular divisions passing the pick-off associated with the measuring wheel.

In order to determine the number of complete revolutions of the boring head there may be a counter operated for example by a magnetic reed relay on a fixed part of the machine and a magnet on a rotating part and co-operating with it, which device is connected to render the disc division counter operable during a pre-determined number of revolutions of the wheel carrier only. For example if the division counter is rendered operable through 10 complete revolutions of the wheel carrier the number of angular divisions counted during that period will represent 10 times the circumference of the bore.

The invention may be carried into practice in various ways and one embodiment will now be described by way of example with reference to the accompanying drawings in which.

Figure 1:
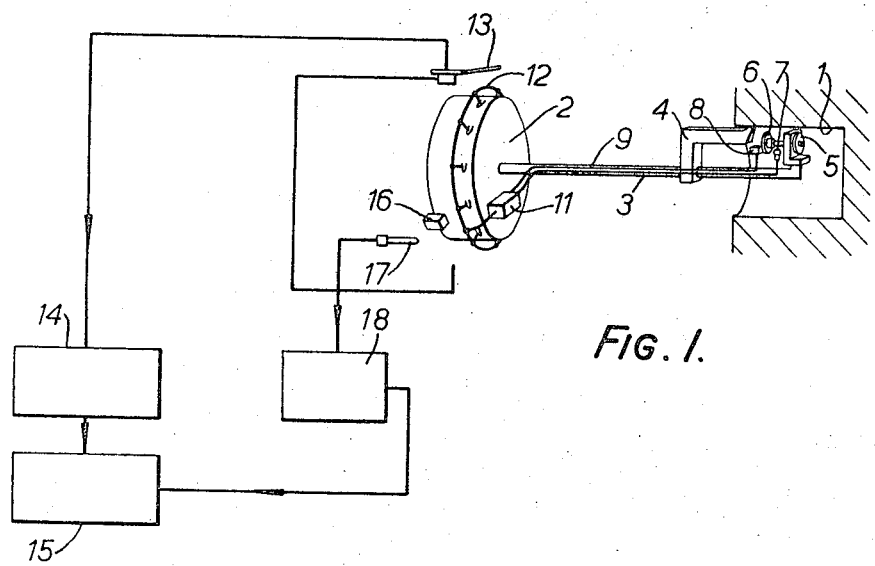
FIGURE 1 is a diagram showing the general operation and the measuring equipment for measuring a bore or other cylindrical surface.

A bore 1 is being machined in a work piece by a horizontal borer whose rotating head 2 only is shown together with the boring bar 3 carrying a tool 4.

The bar 3 also carries a steel wheel 5 on an axis parallel with the bar and mechanism (not shown) for urging the wheel 5 into contact with the wall of the bar in place of the tool 4.

The wheel axle also carries a transparent disc 6 positioned between an electric lamp 7 and a photo-electric pick-off 8. The disc carries a large number of angularly spaced opaque markings so that as the wheel rotates the pick-off will be alternately energised and de-energised.

Flexible electric connections 9 to the cell and the lamp lead along the bar from and to a unit 11 including a battery and a radio transmitter whose output is connected to a ring aerial 12 supported around the circumference of the head 2 by removable connections. The pick-off output is connected to operate a bi-stable circuit in the unit 11 for switching the radio transmitter on and off in accordance with the dark and light parts of the disc passing the cell.

Signals radioed from the aerial 12 are received at a stationary receiving aerial 13 mounted a few inches from the aerial 12 and connected to a detector 14 and counter 15 at a recording or indicating station. The transmitter being described operates at a frequency of, for example, 27 megacycles per second and this carrier is modulated by square waves representing the spaces between lines on the disc 6. The detector 14 extracts the modulation so that square signals are supplied to an electronic or other suitable counter 15.

The head 2 in the boring machine also carries a magnet 16 which passes in operative relationship with a magnetic reed type relay 17 on a stationary part of the machine once in every revolution. The output from the relay 17 is connected to a gate switch 18 controlling the counter 15. If it is set to count 10 revolutions then when a measurement is to be made, the gate is switched on when the magnet 16 passes the relay 17 and this is arranged to render the counter 15 operative to count pulses received at 13. When the magnet 16 passes the relay 17 for the 11th time the gate switch operates to switch off the counter 15 so that the total count over the measuring period is the number of lines on the disc 6 which passed the cell 8 during 10 complete revolutions of the bar 3. This number of lines represents 10 times the circumference of the bore, and from this the diameter can be calculated when the diameter of the wheel 5 and the number of divisions on the disc 6 are known. By using a measuring wheel of convenient diameter the number on the counter may be arranged to indicate the bore diameter directly.

Figure 2:
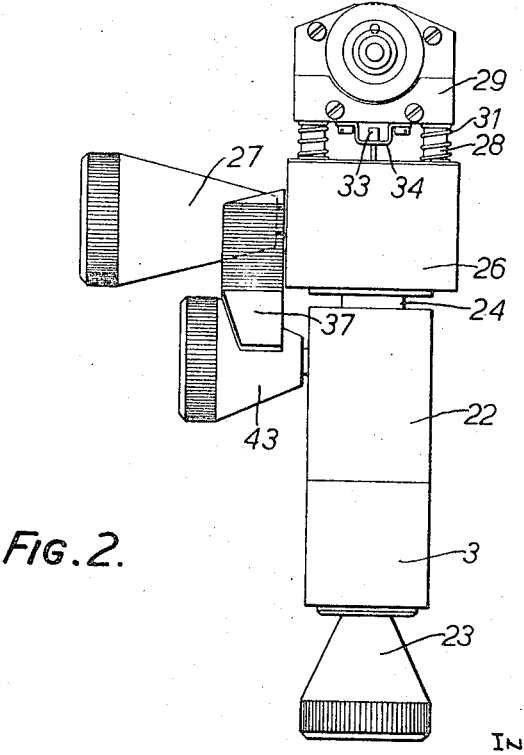
FIGURE 2 is an end elevation to an increased scale of one specific embodiment of the apparatus carrying the wheel.

Details of a preferred form of the equipment carried on the tool bar 3 will now be described with reference to FIGURES 2, 3, and 4.

The bar has a cylindrical bore 21 at its end carrying a post 22 on which the wheel apparatus is mounted. The post is removable and can be clamped in position by a screwed knob 23. The post 22 itself has a bore in which is slidably mounted and keyed against rotation a shaft 24 carrying a holder 25 in which is mounted the wheel carrier 26. This carrier 26 can also be removed upon release of a knob 27.

At its inner end the carrier 26 is bored to receive two sliding dowels 28 on which are mounted the wheel body 29 which is urged away from the carrier 26 towards the wall 1 of the bore by compression springs 31.

The body 29 carrying the wheel 5 can be withdrawn from contact with the surface 1 against the springs 31 by means of a Bowden cable 32 having a teat 33 engaging with a bridge 34 on the body 29 and extending through the carrier 26 around a pulley 35 to an adjusting pulley 36. The adjusting pulley 36 is on a shaft which can be turned by a knob 37 to withdraw the wheel from the surface.

The wheel 5 is mounted on a spindle 38 running in ball bearings 39 in the body and also carrying the wheel 6 which runs between the lamp 7 and the photocell pick-off 8.

Figure 4:
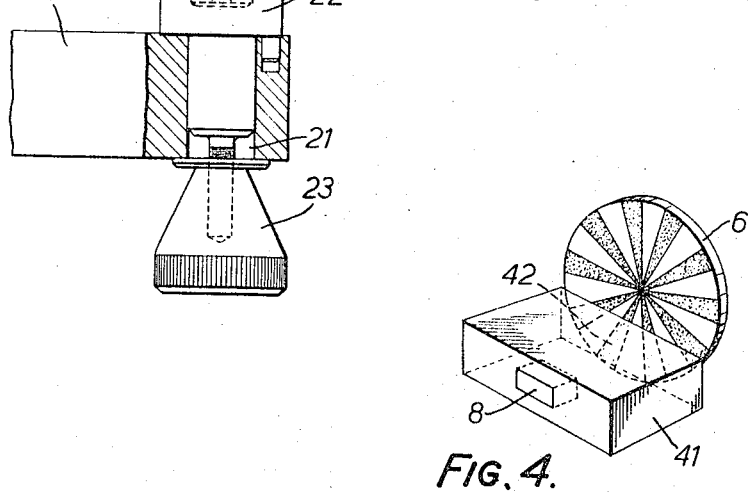
FIGURE 4 is a detail of the equipment of FIGURES 2 and 3 showing diagrammatically the general arrangement of the disc.

As shown in FIGURE 4 the pick-off 8 is in fact mounted in a transparent block 41 having on its surface facing the disc 6 corresponding radial opaque markings 42. It is clear that as the disc 6 rotates the pick-off 8 will be alternately illuminated by the lamp 7.

The shaft connection 24 which can be released by a knob 43 allows radial adjustment of the carrier 26 in accordance with the diameter being measured.

Figure 3:
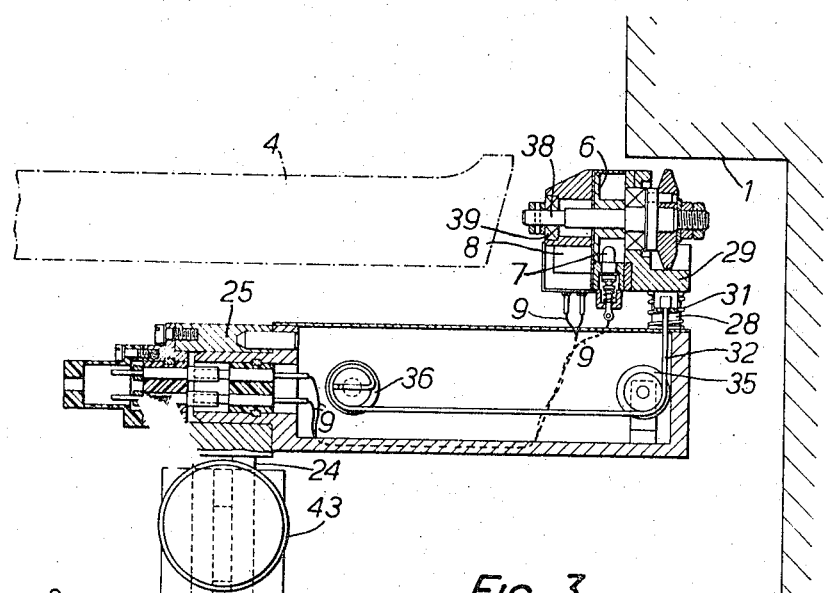
FIGURE 3 is a side elevation in section corresponding to FIGURE 2.

The general arrangement of the electrical connection is not important and will not be described in detail but FIGURE 3 shows a conventional plug and socket connection on the wheel carrier 26 to the unit 11 on the machine tool head 2.

When the tool 4 is to be used for machining the bore the wheel carrier 26 can be turned about the axis of the shaft 24 to be out of the bore so that the tool 4 can have access to the surface to be worked. When the tool is withdrawn to enable the bore to be measured the carrier is merely turned into position as shown in FIGURE 3 and the Bowden cable is released to allow the wheel to be urged into contact with the machined surface. It is thus a simple matter after each cut to measure the diameter achieved without removing the tool from the machine.

The invention has been described as applied to the machining of a bore because this is one application where difficulty has been experienced in repeated measuring but it is clear that it is equally applicable to the measurement of an external cylindrical surface.

What I claim as my invention and desire to secure by Letters Patent is:

1. A machine tool for machining a bore and apparatus for measuring the diameter of the bore during machining comprising a wheel carried on a tool bar for running around the circumference of the cylindrical surface of the bore, and electrical means arranged to sense the number of revolutions and part revolutions of the wheel.

2. A machine tool and apparatus as claimed in claim 1 in which the electrical means includes a disc or drum driven by the wheel and bearing fine angular divisions and an electrical pick-off arranged to count the number of divisions passing it.

3. A machine tool and apparatus as claimed in claim 1 including an engaging device for withdrawing the wheel from contact with the surface and for urging the wheel against the surface.

4. A machine tool and apparatus as claimed in claim 3 in which said apparatus comprises a moving part which carries a radio signal transmitter and said electrical means produces an output to which said transmitter is connected.

5. A machine tool and apparatus as claimed in claim 4 in which said apparatus comprises a stationary part and the radio transmitter supplies an aerial carried on said moving part which co-operates with a receiving aerial on the stationary part.

6. A machine tool and apparatus as claimed in claim 5 in which the electrical means includes a disc or drum driven by the wheel and bearing fine angular divisions and an electrical pick-off arranged to count the number of divisions passing it and in which the wheel, the disc or drum, the pick-off, the radio transmitter and the aerial supplied by the transmitter are removably mounted.

7. A machine tool and apparatus as claimed in claim 2 in which said electrical means produces an output, said apparatus including a radio signal transmitter connected to said output and carried on a moving part of said apparatus and including a receiver of the radio signals and a counter arranged to count received radio signals corresponding to angular divisions passing the pick-off associated with the measuring wheel.

8. A machine tool and apparatus as claimed in claim 7 including a rotatable wheel carrier supported by said tool bar and on which said wheel is mounted, and a counter operating device connected to render the counter operable during a pre-determined number of revolutions of the wheel carrier only.

References Cited
UNITED STATES PATENTS

| | | | |
|---|---|---|---|
| 1,528,315 | 3/1925 | Barr et al. | 33—141 |
| 1,913,512 | 6/1933 | Reynolds | 73—138 |
| 3,010,259 | 11/1961 | Greening | 33—178 XR |
| 3,077,804 | 2/1963 | Manaloris | 33—141 |

LEONARD FORMAN, *Primary Examiner.*

J. M. FREED, *Assistant Examiner.*